United States Patent [19]

Nakamura

[11] Patent Number: 4,512,555

[45] **Date of Patent: * Apr. 23, 1985**

[54] IDLING DEVICE FOR LEVER HOIST

[75] Inventor: Takayoshi Nakamura, Atsugi, Japan

[73] Assignee: Kabushiki Kaisha Kito, Yamanshi, Japan

[ * ] Notice: The portion of the term of this patent subsequent to Nov. 20, 2001 has been disclaimed.

[21] Appl. No.: 507,384

[22] Filed: Jun. 24, 1983

[30] Foreign Application Priority Data

Jul. 2, 1982 [JP] Japan ................................ 57-113927

[51] Int. Cl.[3] .......................... B66F 19/00; B66F 3/30; G05G 1/12; F16D 13/42

[52] U.S. Cl. .................................... 254/350; 254/353; 254/357; 254/376; 192/94; 192/95; 192/101

[58] Field of Search ............... 254/217, 218, 350, 352, 254/353, 355, 357, 366, 369, 376; 192/47, 52, 94, 95, 101

[56] References Cited

U.S. PATENT DOCUMENTS

| | | | |
|---|---|---|---|
| 2,417,492 | 3/1947 | Hinchcliffe | 254/369 X |
| 3,138,231 | 6/1964 | Lock | 192/94 X |
| 4,236,694 | 12/1980 | Kristensson | 254/376 X |

FOREIGN PATENT DOCUMENTS

| | | | |
|---|---|---|---|
| 55-2570 | 1/1980 | Japan | 254/352 |
| 660281 | 11/1951 | United Kingdom | 254/376 |

*Primary Examiner*—Billy S. Taylor
*Assistant Examiner*—Joseph J. Hail, III
*Attorney, Agent, or Firm*—Sughrue, Mion, Zinn, Macpeak & Seas

[57] ABSTRACT

An idling device is able to bring into an idling condition a lever hoist including a change gear provided on driving member threadedly engaged on a driving shaft for driving a sheave winding-up thereabout a chain or rope for a load, an operating lever rockably driven by a hand, winding-up and winding-off driving pawls engageable with teeth of the change gear and changeable in response to the purpose of hoisting or lowering the load, and a braking assembly for preventing the change gear from being driven by a gravity of the load and adapted to be clamped and released by rotative movement of the driving member relative to said driving shaft. According to the invention the idling device comprises brake clamped position holding means between the driving shaft and a manually operatable knob fitted rotatably and axially slidably on the driving shaft and brake over-released preventing means between the driving shaft and the driving member or the knob, thereby enabling the braking assembly to be changed from its clamped condition into its released condition and vice versa by simple operation and capable of preventing the braking assembly from excessively releasing.

10 Claims, 19 Drawing Figures

IDLING DEVICE FOR LEVER HOIST

BACKGROUND OF THE INVENTION

1. Field of the Invention

The present invention relates to an idling device for a lever hoist capable of maintaining its braking assembly in a released condition during idling operation of the hoist but making the braking assembly clamped or operative in lifting and lowering a load.

2. Description of the Prior Art

Idling devices for lever-operated small type hoisting and dragging devices have been known. One of the devices includes a spring interposed between a driving member repeatedly driven by a lever and a driven member of a braking assembly for releasing a braking assembly.

With the known device, since a spring force always acts in a direction releasing the braking assembly, a clamping force for the braking assembly is insufficient when a light load is being hoisted. In hoisting such a light load, therefore, when the lever is repeatedly rocked, the driving member is returned by a return movement of the lever for a next driving movement. Accordingly, such a device cannot hoist a light load. In lowering a light load, on the other hand, a torque resulting from the light load turns a load sheave to cause the load to drop, with the result that such a light load cannot be lowered by the rocking movement of the lever.

SUMMARY OF THE INVENTION

It is an object of the invention to provide an improved idling device for a lever hoist which eliminates the above disadvantages of the prior art and is capable of lifting and lowering even a light load by repeatedly rocking a lever by means for holding a clamped braking assembly.

It is still a more specific object of this invention to provide an improved idling device for a lever hoist whose braking assembly can be easily changed from its clamped condition into its released condition and vice versa by simple operation and capable of preventing the braking assembly from excessively releasing.

An idling device for a lever hoist include a change gear provided on a driving member threadedly engaged on a driving shaft for driving a sheave winding up thereabout a chain, rope or the like for a load. An operating lever is rockable about said driving member by a hand, a winding-up driving pawl engageable with teeth of said change gear and driven by said operating lever in a winding-up direction for the load. An winding-off driving pawl is engageable with the teeth of the change gear and driven by the operating lever in a winding-off direction for the load. A braking assembly preventing said change gear from being driven from a side of said sheave is clamped and released by rotative movement of the driving member relative to said driving shaft. According to the invention the device also comprises an anchoring member fixed to an end of the driving shaft on an opposite side of the braking assembly with respect to said driving member. A manually operatable knob arranged between the driving member and the anchoring member and is fitted rotatably and axially slidably on the driving shaft relative thereto. A brake releasing torsion spring is arranged between the manually operatable knob and the anchoring member to rotate the manually operatable knob into a brake releasing direction relative to the driving shaft. A brake clamping torsion spring is arranged between the driving member and the manually operatable knob to rotate the driving member into a brake clamping direction relative to said manually operatable knob, engagement protrusions formed in said driving member and said manually operatable knob, respectively, and engaging with each other by urging by said brake clamping torsion spring to couple said driving member and said manually operatable knob, brake clamped position holding means for preventing said driving member from rotating into a brake releasing direction when said braking assembly is clamped. Brake over-released preventing means is employed for preventing said driving member from further rotating into said brake releasing direction when said braking assembly is suitably released.

In order that the invention may be more clearly understood, preferred embodiments will be described, by way of example, with reference to the accompanying drawings.

DETAILED DESCRIPTION OF THE PREFERRED EMBODIMENT

Figure 1:
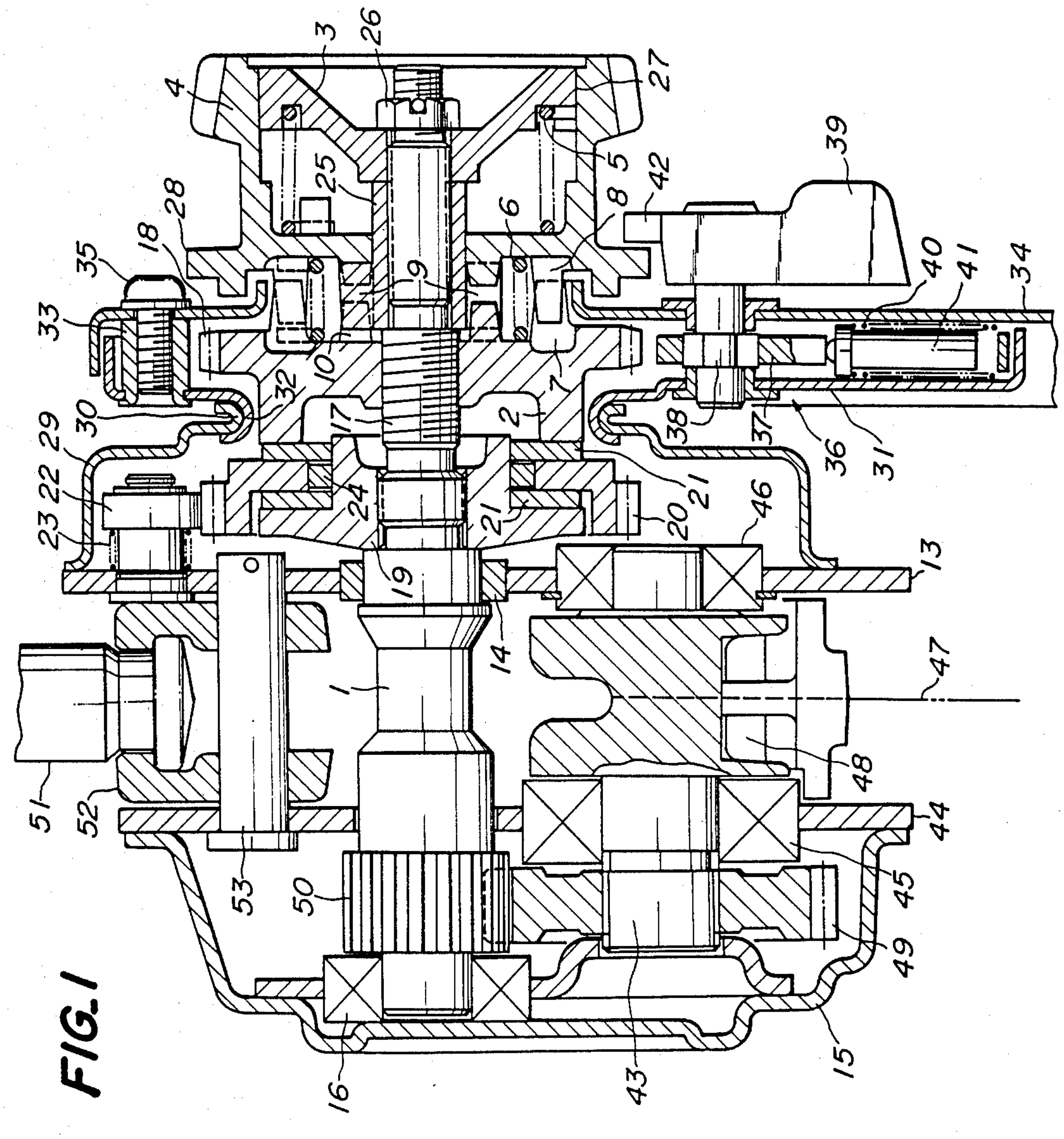
FIG. 1 is a sectional view of a part of a lever hoist under an operated condition provided with an idling device of a first embodiment of the invention.
Figure 2:
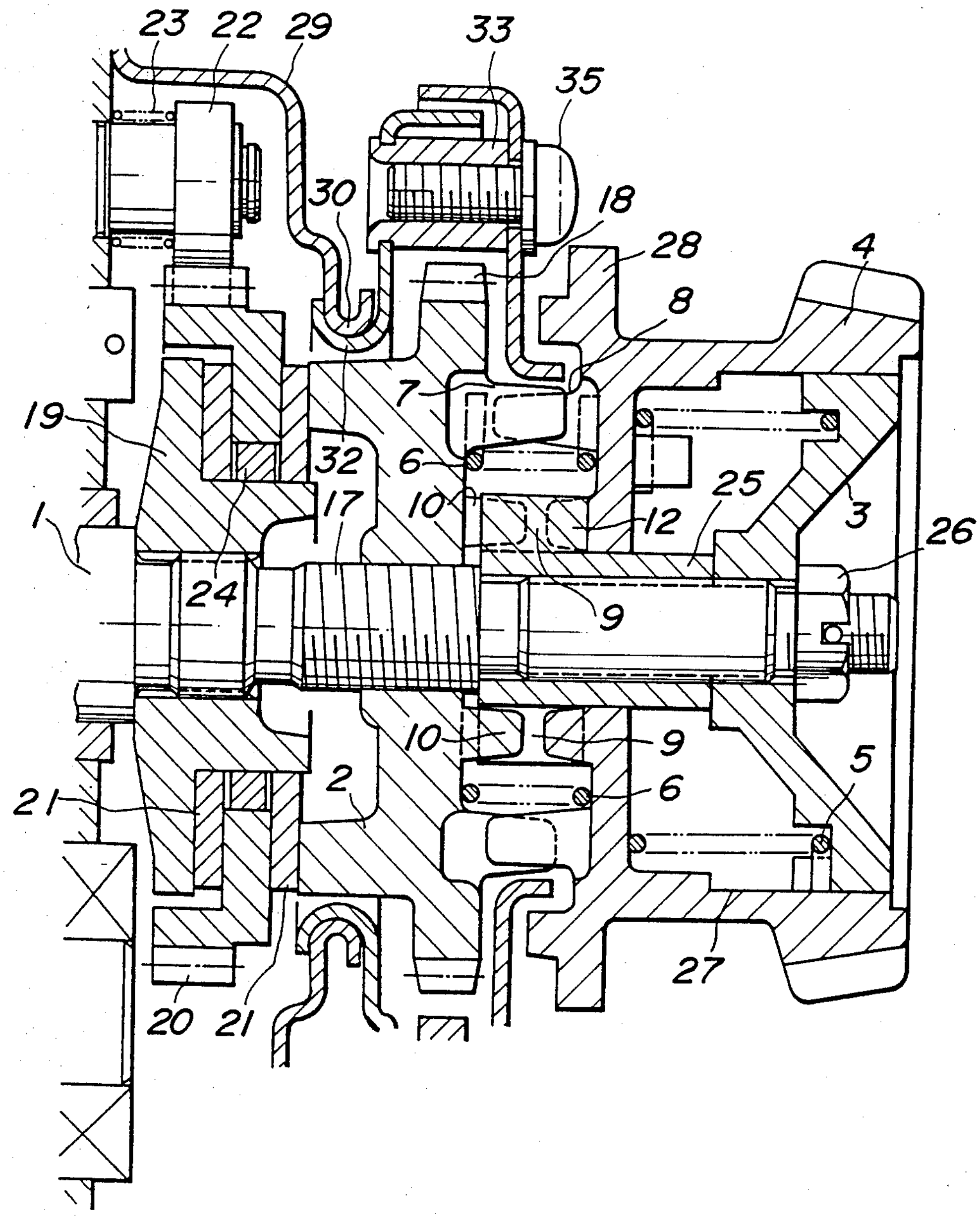
FIG. 2 is an enlarged sectional view of a part of the lever hoist shown in FIG. 1.
Figure 3:
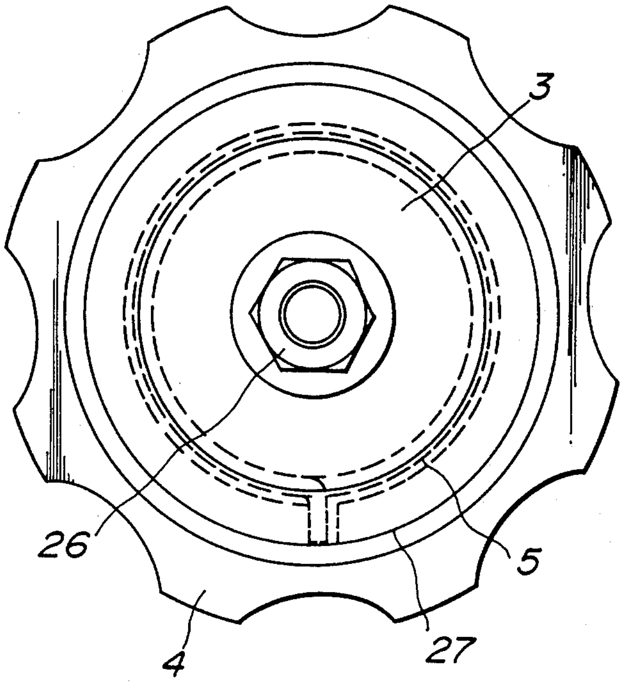
FIG. 3 is a side view of a part of the hoist shown in FIG. 2.

Referring to FIGS. 1–12, illustrating one embodiment of the idling device of a lever hoist according to the invention, particularly FIG. 1, a driving shaft 1 extending from the right to the left as viewed in FIG. 1 is journaled at its mid portion by a bearing 14 in a frame 13 and has a front end (left end as viewed in FIG. 1) journaled by a bearing 16 in a gear box 15 and on a rear side of the frame 13 the other end formed with external screw threads 17 for a braking assembly adapted to be threadedly engaged with internal screw threads of a driving member 2 having a change gear 18. A driven member 19 is fitted against rotation on the driving shaft 1 between the frame 13 and driving member 2 and abuts against an enlarged diameter portion of the driving shaft 1 journaled by the bearing 14.

In the specification, the word "front" or "forward" means the side of a sheave of the lever hoist or the left side as viewed in FIG. 1, while the word "rear" or "rearward" means the side of an operating lever or the right side as viewed in FIG. 1.

Between the driving member 2 and the driven member 19 are interposed a brake ratchet wheel 20 and friction plates 21 abutting against opposite sides thereof. A brake pawl 22 pivotally secured to the frame 13 is brought into engagement with the brake ratchet wheel 20 by an engagement spring 23. The brake ratchet wheel 20 has a center hole within which is fitted an oilless bearing 24 of a sintered alloy. The ratchet wheel 20, friction plates 21 and bearing 24 are fitted on a reduced diameter portion of the driven member 19 to form a braking assembly.

Figure 4:
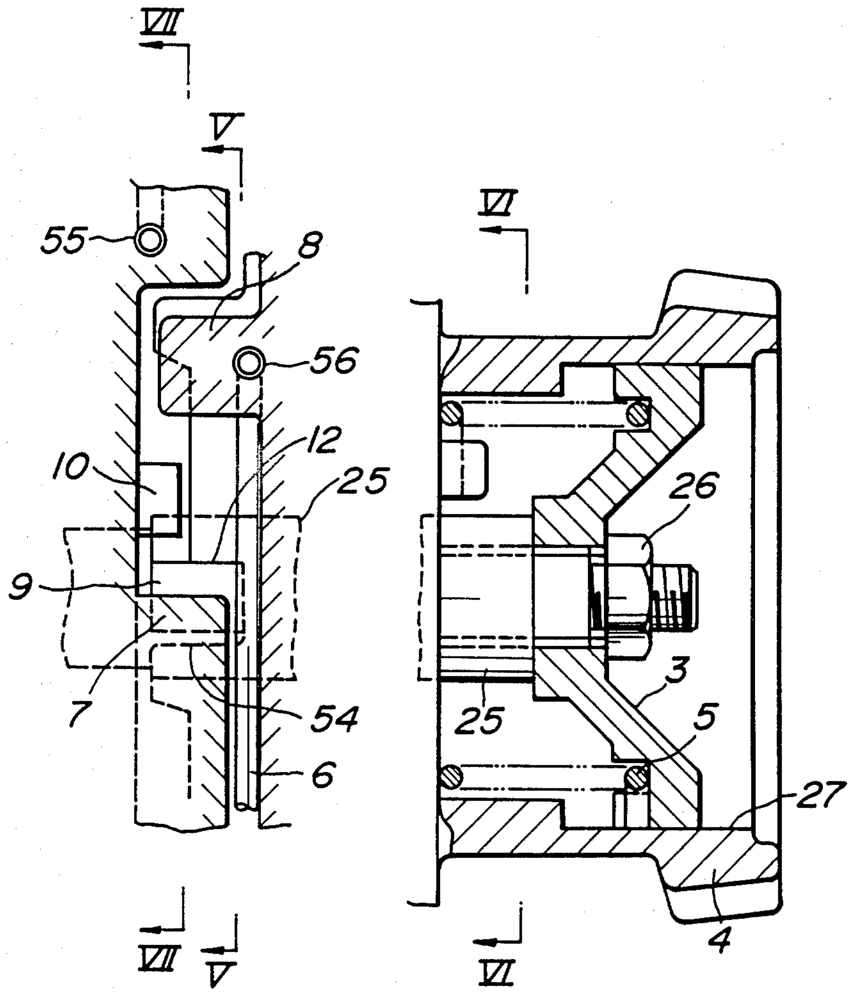
FIG. 4 is a partial development and partial sectional view of the device shown in FIG. 2 under a clamped condition.

A support sleeve 25 having a cylindrical surface and an anchoring member 3 are successively fitted on the driving shaft 1 against rotation relative thereto on the rear side of the external screw threads 17 by spline grooves or the like and fixed by a nut 26 which is threadedly engaged with external screw threads on the rear distal end of the driving shaft 1 and locked by locking means such as a split pin. A manually operatable knob 4 having an engagement flange 28 and a recess 27 for receiving the anchoring member 3 is fitted rotatably and axially slidably on the support sleeve 25 between the driving member 2 and anchoring member 3. Between the anchoring member 3 and the knob 4 is arranged a brake releasing torsion spring 5 for causing the knob 4 to rotate relative to the driving shaft 1 so as to release the braking assembly. The torsion spring 5 has curved ends respectively anchored in spring receiving portions respectively formed on the anchoring member 3 and the knob 4 as shown in detail in FIGS. 2 and 4. Between the driving member 2 and the knob 4 a brake clamping torsion spring 6 is arranged for causing the driving member 2 to rotate relative to the knob 4 to clamp the braking assembly. The torsion spring 6 has curved engagement ends which are fitted under an axially extended condition of the spring 6 in anchoring apertures 55 and 56 formed in engagement portions 7 and 8 of the driving member 2 and knob 4 as shown in FIG. 4, so that the knob 4 is normally pulled toward the driving member 2 by means of the torsion spring 6.

Figure 5:
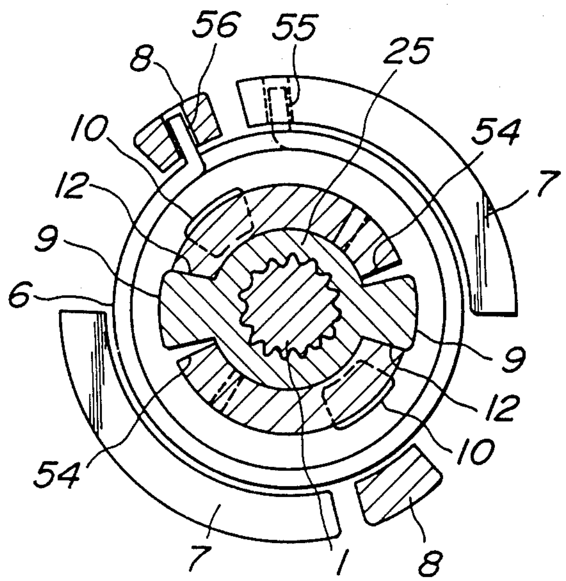
FIG. 5 is a sectional view taken along a line V—V in FIG. 4.
Figure 6:
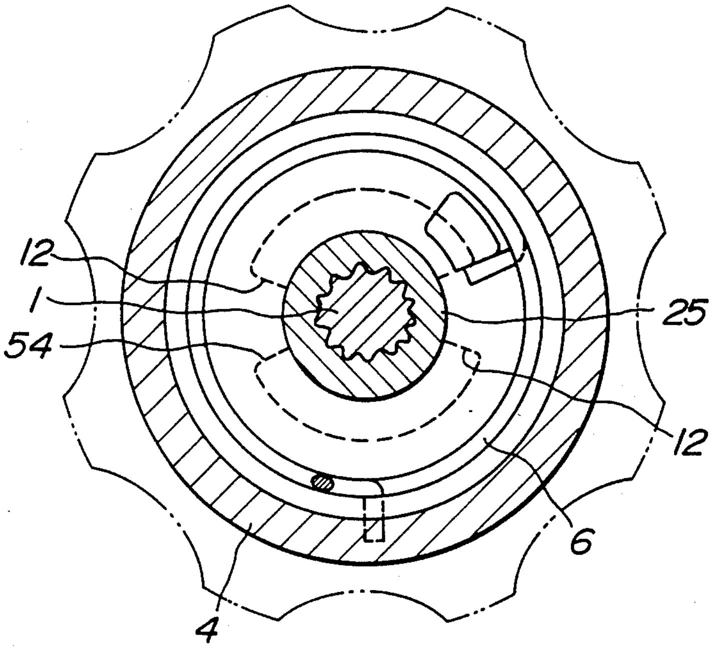
FIG. 6 is a sectional view taken along a line VI—VI in FIG. 4.

The driving member 2 and the knob 4 are provided on their surfaces facing to each other with the urgingly coupling engagement portions 7 and 8 to form two sets of protrusions respectively diametrically opposed as shown in FIG. 5. In this embodiment, these engagement portions 7 and 8 are arranged in a circle and the portion 7 is arcuate. The support sleeve 25 is integrally provided on its front end cylindrical surface with two engagement projections 9 diametrically opposed. The driving member 2 is provided on its surface facing the knob 4 with brake over-released preventing projections 10 adapted to engage the projections 9 of the support sleeve 25 for preventing the braking assembly from excessively releasing.

Figure 7:
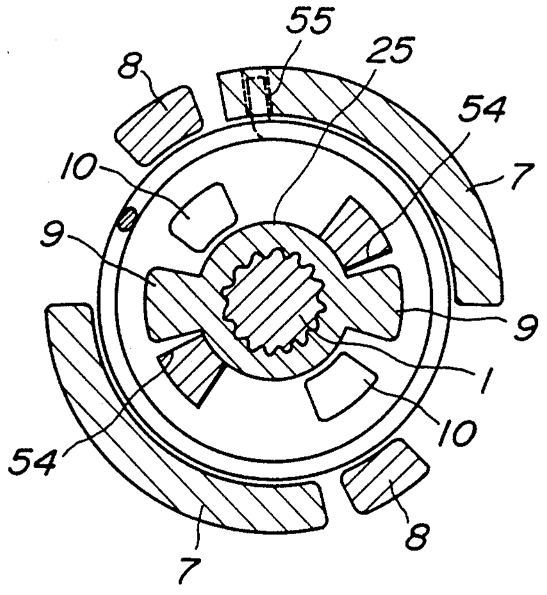
FIG. 7 is a sectional view taken along a line VII—VII in FIG. 4.
Figure 8:
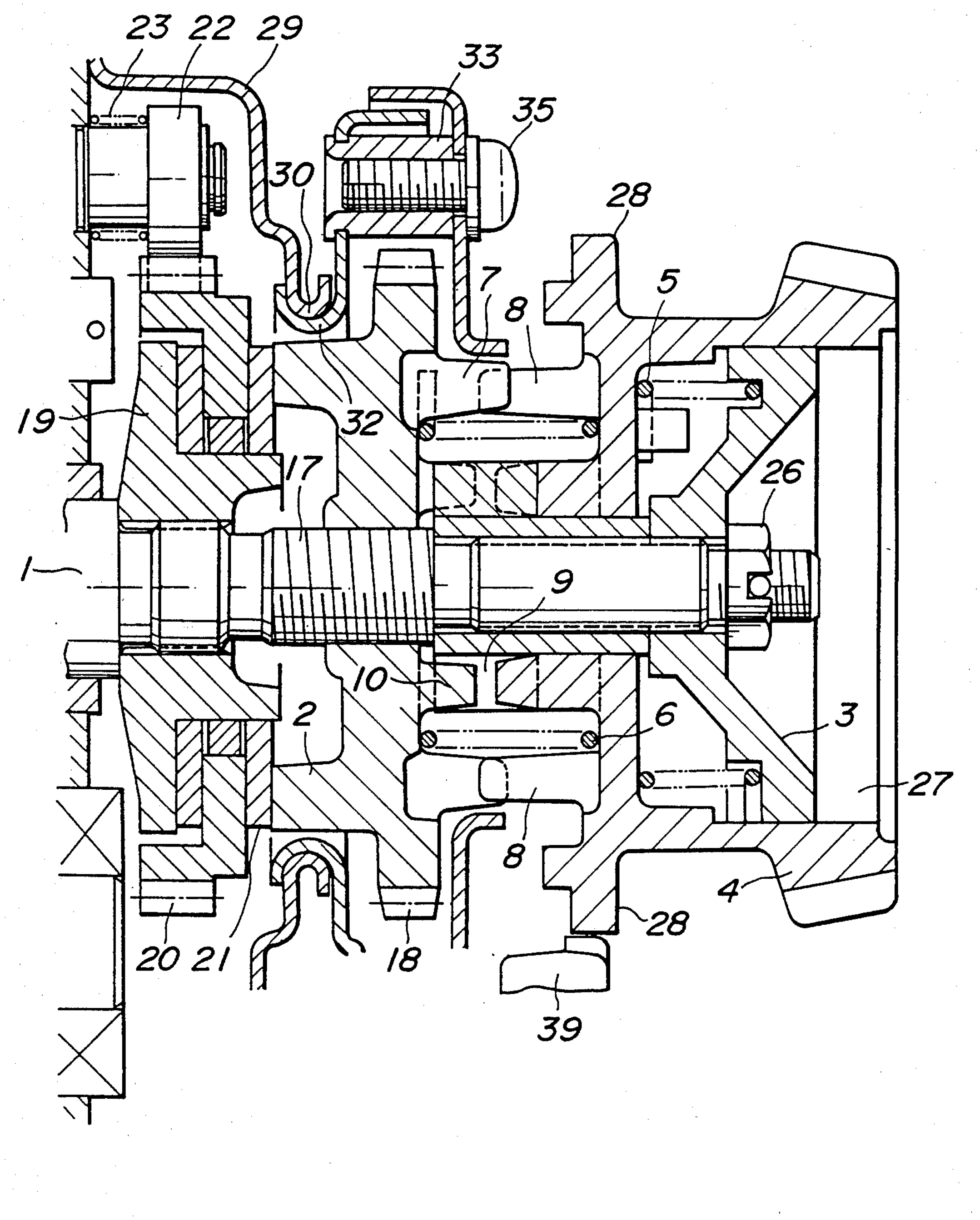
FIG. 8 is a sectional view of the part similar to FIG. 2, but under an idling condition.
Figure 9:
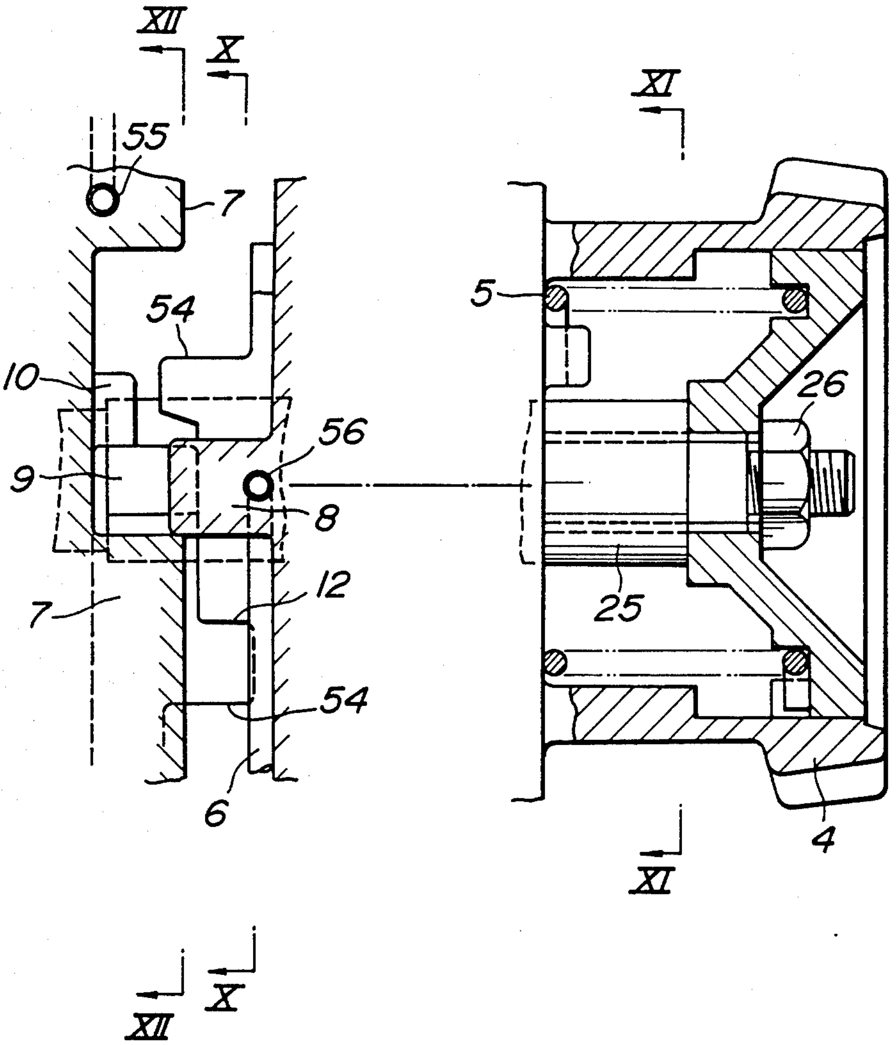
FIG. 9 is a partial development and partial sectional view of the part shown in FIG. 8.
Figure 10:
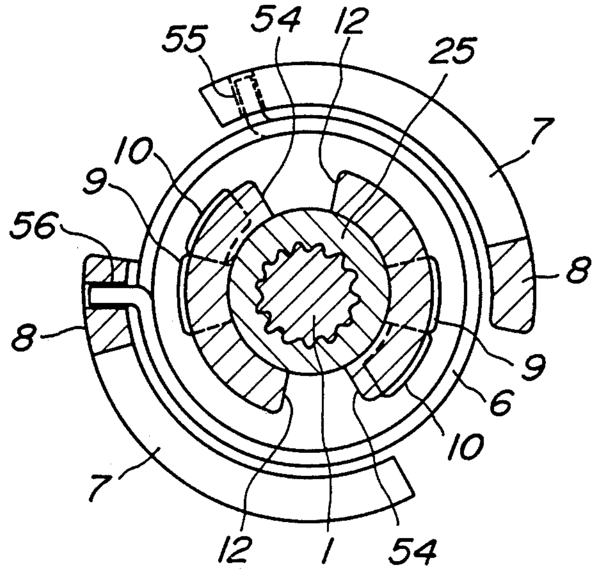
FIG. 10 is a sectional view taken along a line X—X in FIG. 9.
Figure 11:
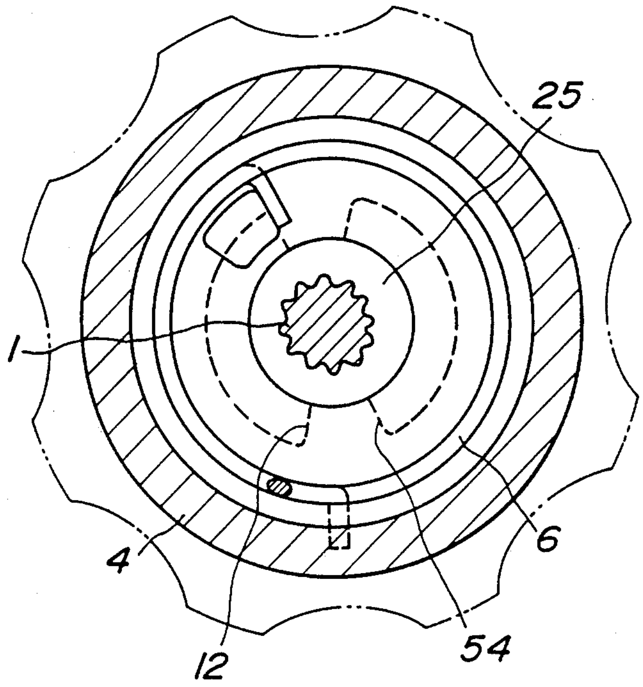
FIG. 11 is a sectional view taken along a line XI—XI in FIG. 9.
Figure 12:
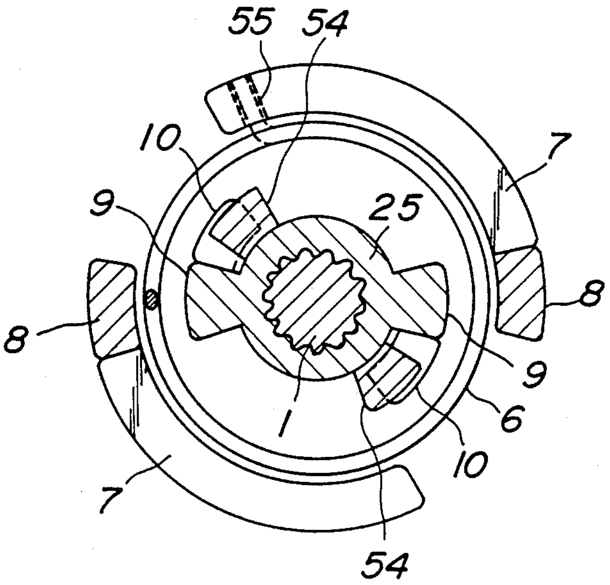
FIG. 12 is a sectional view taken along a line XII—XII in FIG. 9.

The manually operatable knob 4 is formed in its front surface with forward opening grooves into which the engagement projections 9 of the support sleeve 25 are detachably fitted. One groove side surface of the forward opening grooves is brake clamped position holding engagement portions 12 for holding a brake clamping position of the driving member 2 and the other groove side surfaces are brake clamping rotation limiting stoppers 54 for limiting a rotation of the driving member 2 in the brake clamping direction. The stoppers 54 extend longer toward the driving member 2 than the engagement portions 12 as shown in FIG. 4. Moreover, the engagement projections 9, brake over-released preventing projections 10, brake clamped position holding engagement portions 12 and brake clamping rotation limiting stoppers 54 are located radially inwardly of the urgingly coupling engagement portions 7 and 8 and hence nearer to the driving shaft 1 as shown in FIGS. 5 and 7.

The driven member 19, brake ratchet wheel 20, friction plates 21, brake pawl 22 and front part of the driving member 2 are covered by a metal brake cover 29 formed on its rear side by press forming with a fixed support ring 30 having a U-shaped cross-section in opposition to a front outer circumferential surface of the driving member 2. An inner lever component member 31 made of metal plates is formed by press forming with a rotatable support ring 32 on its intermediate portion adjacent to the brake cover 29. The support ring 32 is adapted to be fitted in the fixed support ring 30 rotatable but against axial movement relative thereto in a manner enclosing the support ring 30. Cylindrical spacers 33 having internal screw threads are fitted and fixed by calking in apertures of the bottom portion of inner and outer lever component members 31 and 34 which are joined by connecting bolts 35 threadedly engaged within the spacers 33 to form an operating lever 36 rockable about a center line of the change gear 18.

The brake cover 29 is fixed on its front side to the frame 13 by means of bolts (not shown). A handle or knob 39 is fixed to a pivot shaft 38 rotatably supported in the operating lever 36. To the pivot shaft 38 is fixed a change pawl metal 37 including a winding-up direction driving pawl and a winding-off direction driving pawl which are detachably engageable with the change gear 18 and a winding-up direction holding engagement portion, a winding-off direction holding engagement portion and a neutral position holding engagement portion. In order to engage the winding-up or winding-off direction driving pawl with the change gear 18 or arrange the neutral position holding engagement portion into a required position, the knob 39 is rotated to cause the change pawl metal 37 to rotate to position the above pawl or the portion in each required position.

The change pawl metal 37 engages a holding member 41 which is urged toward the metal 37 by means of an engagement spring 40. The knob 39 is integrally formed with a plurality of (two in this embodiment) malfunction preventing engagement pieces 42 spaced apart from each other and arranged adjacent to the flange 28 of the knob 4. In assembling the knob 39 in the operating lever 36, a positional relation between the flange of the knob 4 and the malfunction preventing engagement pieces 42 is determined in the following manner. After the knob 4 has been rotated to move in the brake clamping direction into a position and has been further pushed into a brake operating position, when the winding-up or winding-off direction driving pawl is engaged with the change gear 18, any one of the engagement pieces 42 is closely adjacent to a rear face of the engagement flange 28 of the knob 4, thereby preventing the knob 4 from moving rearward out of the brake operating position. Moreover, when the change pawl metal 37 is changed into a neutral position by rotating the knob 39, both the engagement pieces 42 of the knob 39 becomes out of the close adjacent position to the flange 28 of the knob 4, thereby enabling the knob 4 to be moved rearward away from the driving member 2.

A driven shaft 43 is arranged in parallel with and under the driving shaft 1. A mid portion of the driven shaft 43 is journaled in a bearing 45 in a frame 44 closing an opening of a gear box 15 and a rear end of the shaft 43 is journaled in a bearing 46 in the frame 13. The driven shaft 43 is formed integrally with a load sheave 48 between the frames 13 and 44 for winding a chain 47 (symbolically shown in a chain line in FIG. 1) thereabout. In the gear box 15, the driven shaft 43 is provided with a large gear 49 fixed thereto adapted to engage a pinion 50 formed in the front end of the driving shaft 1.

In FIG. 1, an upper hook 51 is anchored to a hook support metal 52 mounted on a support rod 53 extending between the frames 13 and 44.

The operation of the device above described will be explained hereinafter.

FIGS. 8–12 illustrate the lever hoist under an idling or brake released condition. Starting from the brake clamped condition as shown in FIGS. 1–7, the manually operatable knob 4 is axially moved away from the driving member 2 rearward or to the right as viewed in FIG. 1 to disengage the engagement projections 9 of the support sleeve 25 from the grooves of the knob 4 so as to permit the knob 4 to be rotated in the brake releasing direction by the torsion spring 5. As the result, the engagement portions 8 of the knob abut against of the engagement portions 7 of the driving member 2 to couple the knob 4 to the driving member 2 so as to rotatively drive the driving member 2 until the brake over-released preventing projections 10 of the driving member 2 engage the engagement projections 9 fixed to the support sleeve 25 (FIG. 10) to prevent the driving member 2 from rotating relative to the driving shaft, thereby maintaining the braking assembly in the released or idling condition. Accordingly, the idling operation of the hoist can be effected by rotating the knob 4 or pulling the load chain 47.

When it is required to change the lever hoist from the idling condition as shown in FIGS. 8–12 to the brake clamped condition as shown in FIGS. 1–7, after the chain 47 is held to prevent the load sheave 48 from rotating, the knob 4 is gripped by one hand and rotated into the brake clamping direction against the force of the brake releasing torsion spring 5, so that the driving member 2 is rotated to move toward the braking assembly by the knob 4 through the brake clamping torsion spring 6 so as to clamp the braking assembly.

After the braking assembly has been clamped in this manner, when the knob 4 is further rotated into the brake clamping direction, the brake clamping force of the brake clamping torsion spring 6 is increased although the driving member 2 is not rotated. Thereafter, when the stoppers 54 of the knob 4 engage the engagement projections 9 of the support sleeve 25, the knob 4 is axially advanced forward or to the left as viewed in FIG. 1 to engage the brake clamped position holding engagement portions 12 of the knob 4 with the engagement projections 9 of the support sleeve 25, thereby maintaining the brake assembly in the operating or clamped condition.

In this embodiment, the support sleeve 25 is fitted on the rear portion of the driving shaft 1 against rotation relative thereto and is integrally formed with the engagement projections 9, and the knob 4 is rotatably and axially movably fitted on the driving shaft 1. However, the support sleeve 25 may be dispensed with, so that the engagement projections 9 may be directly fixed to the driving shaft 1 and the manually operatable knob 4 may be directly fitted on the driving shaft 1 rotatably and axially movably.

Only one set of the engagement portions 7 and 8, the engagement projection 9, the brake over-released preventing projection 10 and the brake clamping position holding engagement portion 12 may be provided. When two or more sets of them are provided, they may not necessarily be arranged equally angularly spaced. One of the engagement portions 7 and 8 may be formed as a portrusion and the other may be an end of an elongated arcuate groove for receiving the protrusion.

Figure 13:
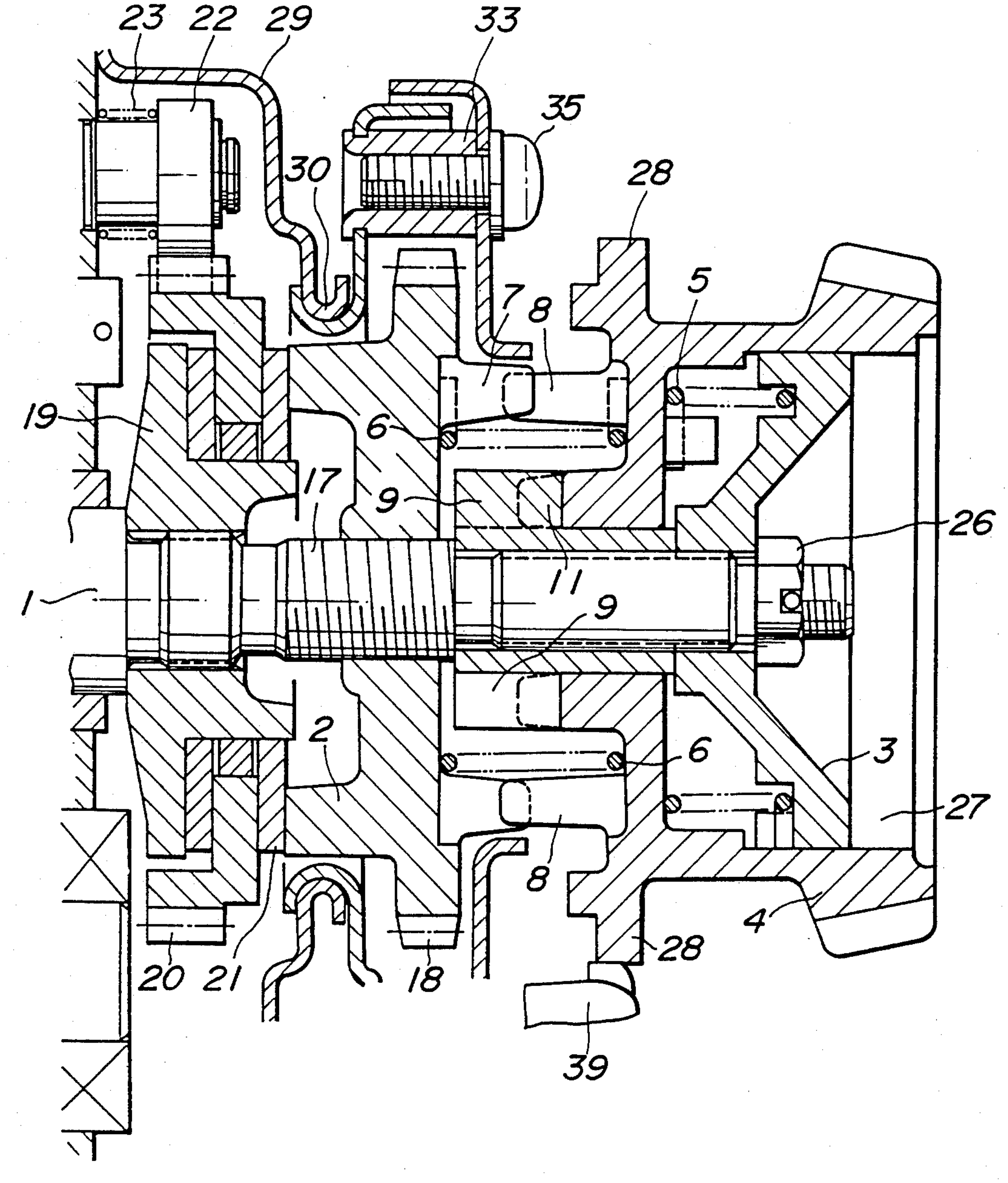
FIG. 13 is a sectional view of a part of an idling device of a second embodiment of the invention under an idling condition.
Figure 14:
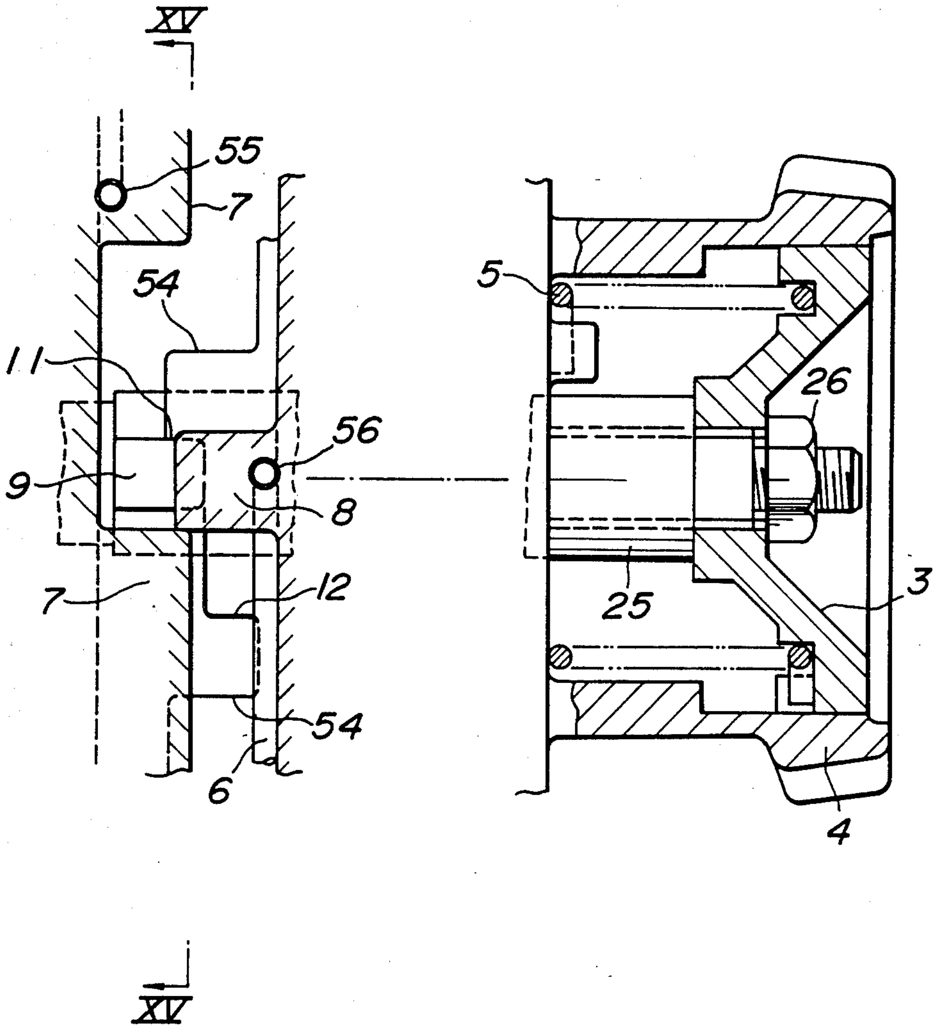
FIG. 14 is a partial development and partial sectional view of the device shown in FIG. 13.
Figure 15:
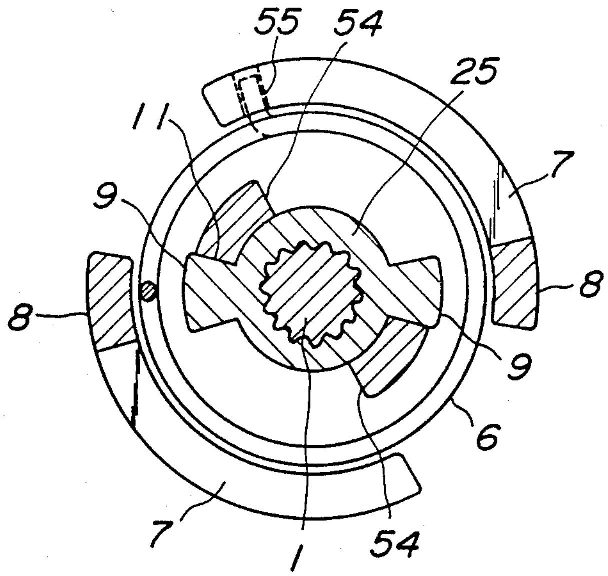
FIG. 15 is a sectional view taken along a line XV—XV in FIG. 14.

FIGS. 13–15 illustrate a second embodiment of the invention. In this embodiment, a driving member 2 does not include the brake over-released preventing projections 10 in the first embodiment. Instead of the projections 10, a manually operatable knob 4 is provided with brake over-released preventing projections 11 adapted to be engaged with engagement projections 9 of a support sleeve 25. The idling device of this second embodiment is substantially the same as that of the first embodiment in construction and operation with exception of these different portions.

FIGS. 16–19 illustrate a third embodiment of the invention. In this embodiment, a manually operatable knob 4 is provided on its front side with engagement projections 9, while a support sleeve 25 is provided on its front side with brake over-released preventing projections 11, brake clamped position holding engagement portions 12 and brake clamping rotation limiting stoppers 54. The idling device of this third embodiment is substantially similar to that of the first embodiment in construction and operation with exception of the knob 4 and the support sleeve 25. In the third embodiment, the support sleeve 25 may be dispensed with and the projections 11, portions 12 and stoppers 54 may be fixed to the driving shaft 1.

Figure 16:
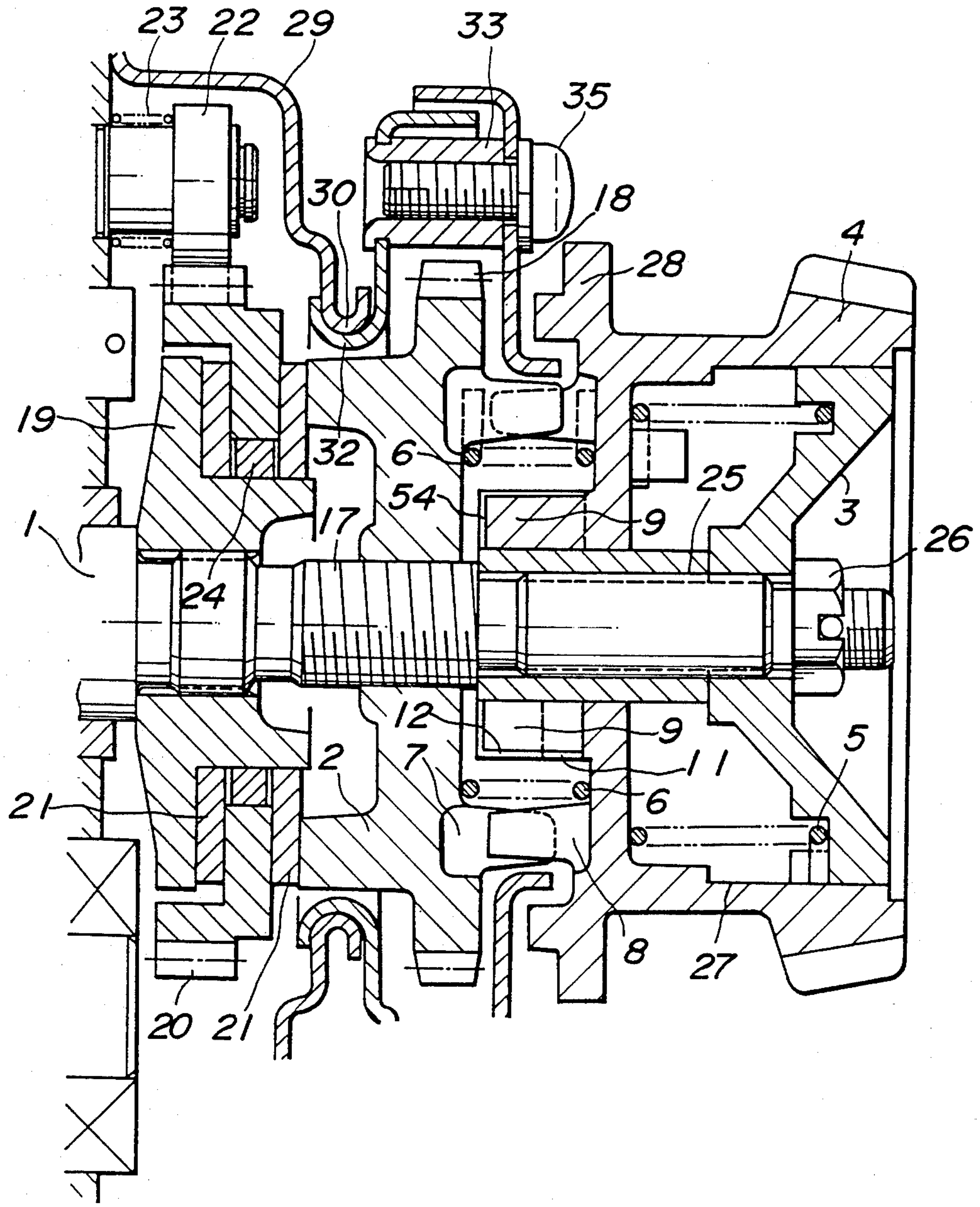
FIG. 16 is a sectional view of a part of an idling device of a third embodiment of the invention under a clamped condition.
Figure 17:
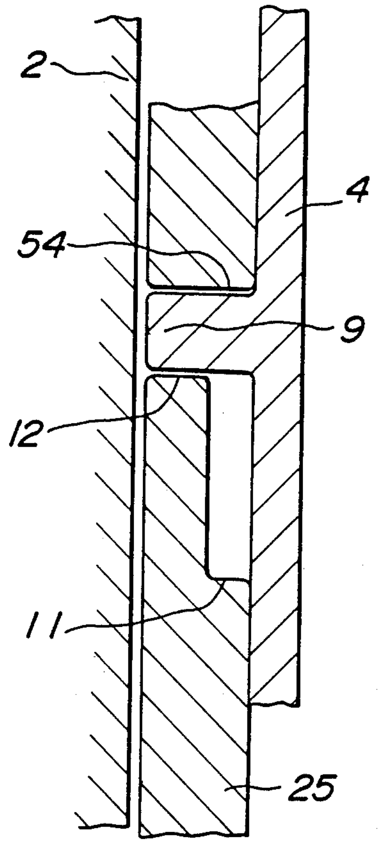
FIG. 17 is a partial development view of the device shown in FIG. 16.
Figure 18:
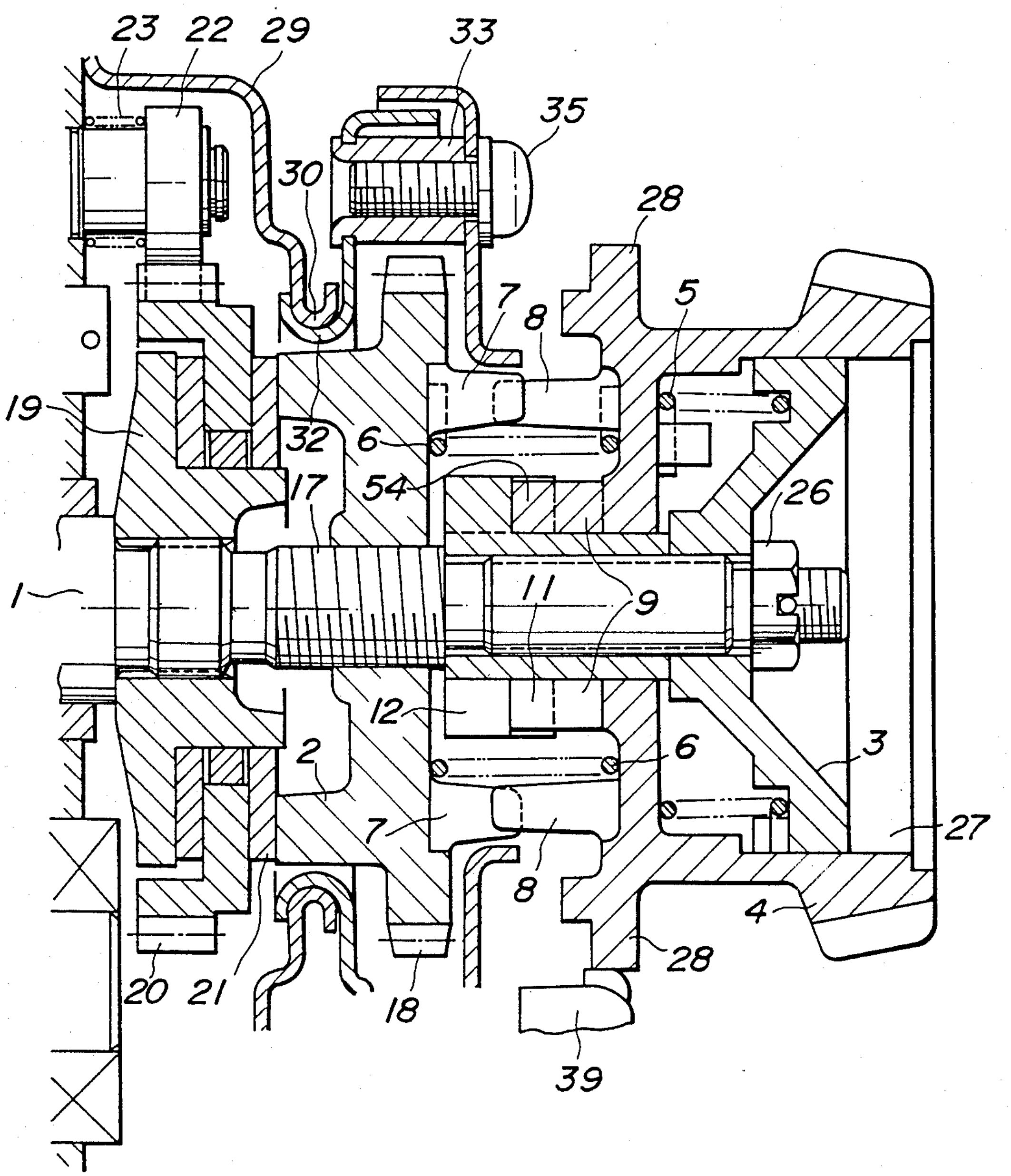
FIG. 18 is a sectional view similar to FIG. 16, but under an idling condition.
Figure 19:
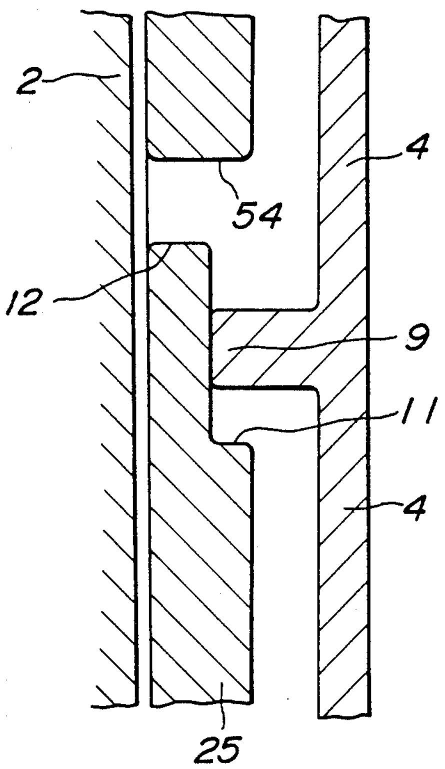
FIG. 19 is a partial development view of the part shown in FIG. 18.

In this third embodiment, in the same manner as in the previous embodiments, a brake clamping torsion spring 6 is selected to be subjected to tensile force when its ends are anchored to the driving member 2 and the knob 4, so that the knob 4 is always urged in the forward direction or to the left as viewed in FIG. 16. With this arrangement, only by rotating the knob 4 against the torsional action of the torsion spring 6 until the engagement projections 9 of the knob 4 abut against the stoppers 54 of the support sleeve 25, the knob 4 can be automatically advanced to its engaged position with the aid of the forward tensile force of the brake clamping torsion spring 6. As an alternative, if the torsion spring 6 is arranged so as not to pull the knob 4 and driving member 2 toward each other, the knob 4 can be advanced only by slightly pushing the knob 4. In the above three embodiments, the brake clamping torsion spring 6 may not be set in tensile condition and the brake releasing torsion spring 5 may be set in compressive condition whose compressive force urges the knob 4 toward the driving member 2, compressing the torsion spring 6. With this arrangement, the anchored ends of the torsion spring 6 may be simply engaged with the torsion receiving portions of the knob 4 and the driving member 2 without fitting or restraining the anchored ends in the anchoring apertures 55 and 56, so that the construction in connection with the anchored ends of the torsion spring 6 can be simplified.

According to the invention, starting from the condition wherein the engagement projections 9 and the brake clamped position holding engagement portions 12 are engaged to clamp the braking assembly, when the knob 4 is moved rearward or to the right as viewed in FIG. 1 to disengage the engagement portions 12 from the engagement projections 9, the knob 4 is rotated relative to the driving shaft 1 in the brake releasing direction by the action of the brake releasing torsion spring 5 to cause the driving member 2 to rotate in the brake releasing direction by the engagement portions 7 and 8. Accordingly, by simply moving the manually operatable knob 4 axially rearward under the brake clamped condition, the brake assembly can be automatically changed into the released condition to make it possible to effect the idling operation by manually rotating the knob 4 or manually pulling the load chain 47. Moreover, when the braking assembly is released to a suitable extent, the engagement projections 9 engage the brake over-released preventing projections 10 or 11 to prevent the braking assembly from excessively releasing. Furthermore, with the driving shaft 1 being held against rotation by holding the load chain 47 or by other means, the knob 4 is gripped and rotated in the brake clamping direction against the force of the brake releasing torsion spring 5 and is then advanced forwardly to engage the brake clamped position holding engagement portions 12 of the knob 4 with the engagement projections 9. By such a simple operation, the braking assembly can be changed from the idling or released condition to the operating or clamped condition, thereby lifting and lowering a light load to say nothing of a heavy load without any trouble. Moreover, when the manually operatable knob 4 is in its brake clamping position, the braking assembly is securely clamped by the brake clamping torsion spring 6, thereby assuring the proper lifting and lowering operations.

It is further understood by those skilled in the art that the foregoing description is that of preferred embodiments of the disclosed devices and that various changes and modifications may be made in the invention without departing from the spirit and scope thereof.

What is claimed is:

1. An idling device for a lever hoist including a change gear provided on a driving member threadedly engaged on a driving shaft for driving a sheave winding up thereabout a chain, rope or the like for a load, an operating lever rockable about said driving member by a hand, a winding-up driving pawl engageable with teeth of said change gear and driven by said operating lever in a winding-up direction for the load, and a braking assembly preventing said change gear from being driven from a side of said sheave and being clamped and released by rotative movement of said driving member relative to said driving shaft, said device comprising an anchoring member fixed to an end of said driving shaft on an opposite side of said braking assembly with respect to said driving member, a manually operatable knob arranged between said driving member and said anchoring member and fitted rotatably and axially slidably on said driving shaft relative thereto, a brake releasing torsion spring arranged between said manually operatable knob and said anchoring member to rotate said manually operatable knob into a brake releasing direction relative to said driving shaft, a brake clamping torsion spring arranged between said driving member and said manually operatable knob to rotate said driving member into a brake clamping direction relative to said manually operatable knob, engagement protrusions formed in said driving member and said manually operatable knob, respectively, and engaging with each other by urging by said brake clamping torsion spring to couple said driving member and said manually operatable knob, brake clamped position holding means for preventing said driving member from rotating into a brake releasing direction when said braking assembly is clamped, and brake over-released preventing means for preventing said driving member from further rotating into said brake releasing direction when said braking assembly is suitably released.

2. An idling device as set forth in claim 1, wherein said manually operatable knob is formed as a hollow cylinder whose bottomed end is arranged on a side of said driving member and whose opened end slidably receives said anchoring member.

3. An idling device as set forth in claim 1, wherein said engagement protrusions are arranged in a circle when assembled in the lever hoist and each set of the protrusions of the driving member and the manually operatable knob are diametrically opposed.

4. An idling device as set forth in claim 1, wherein said brake clamped position holding means comprises side surfaces of grooves formed in said manually operatable knob on a side facing to said driving member, and engagement projections fixed to said driving shaft which engage said side surfaces of said grooves of the knob to prevent said driving member from rotating into said brake releasing direction, and said brake over-released preventing means comprises said engagement projections fixed to said driving shaft and further engagement projections formed in said driving member so as to engage said engagement projections of the driving shaft to prevent said driving member from further rotating into said brake releasing direction.

5. An idling device as set forth in claim 4, on said driving shaft is fixedly fitted a support sleeve on which said manually operatable knob is fitted rotatably and axially slidably relative to said support sleeve and hence said driving shaft, and said engagement projections fixed to said driving shaft are formed on said support sleeve.

6. An idling device as set forth in claim 1, wherein said brake clamped position holding means comprises side surfaces of grooves formed in said manually operatable knob on a side facing to said driving member, and engagement projections fixed to said driving shaft which engage said side surfaces of said grooves of the knob to prevent said driving member from rotating into said brake releasing direction, and said brake over-released preventing means comprises said engagement projections fixed to said driving shaft and further engagement projections formed in said manually operatable knob so as to engage said engagement projections of the driving shaft to prevent said driving member from further rotating into said brake releasing direction.

7. An idling device as set forth in claim 6, on said driving shaft is fixedly fitted a support sleeve on which said manually operatable knob is fitted rotatably and axially slidably relative to said support sleeve and hence said driving shaft, and said engagement projections fixed to said driving shaft are formed on said support sleeve.

8. An idling device as set forth in claim 1, wherein said brake clamped position holding means comprises side surfaces of grooves formed in said driving shaft, and engagement projections formed in said manually operatable knob which engage said side surfaces of said grooves of said driving shaft to prevent said driving member from rotating into said brake releasing direction, and said brake over-released preventing means comprises said engagement projections formed in said manually operatable knob and further engagement projections formed in said driving shaft so as to engage said engagement projections of the knob to prevent said driving member from further rotating into said brake releasing direction.

9. An idling device as set forth in claim 8, on said driving shaft is fixedly fitted a support sleeve on which said manually operatable knob is fitted rotatably and axially slidably relative to said support sleeve and hence said driving shaft, and said grooves and said engagement projections fixed to said driving shaft are formed in and on said support sleeve.

10. An idling device as set forth in any one of claims 4, 6 and 8, wherein remaining side surfaces of said grooves for constituting said brake clamped position holding means form brake clamping rotation limiting stoppers which engage the mating engagement projections of said brake clamped position holding means to limit the driving member from further rotating before the engagement of said side surfaces and said engagement projections of said brake clamped position holding means.

* * * * *